United States Patent
Rothschild (10) Patent No.: US 9,953,494 B2
(45) Date of Patent: Apr. 24, 2018

(54) DEVICE, SYSTEM AND METHOD FOR MOBILE DEVICES TO COMMUNICATE THROUGH SKIN RESPONSE

(76) Inventor: Leigh M. Rothschild, Sunny Isles Beach, FL (US)

(*) Notice: Subject to any disclaimer, the term of this patent is extended or adjusted under 35 U.S.C. 154(b) by 555 days.

(21) Appl. No.: 13/248,727

(22) Filed: Sep. 29, 2011

(65) Prior Publication Data

US 2012/0218090 A1    Aug. 30, 2012

Related U.S. Application Data

(60) Provisional application No. 61/446,774, filed on Feb. 25, 2011.

(51) Int. Cl.
*H04B 3/36* (2006.01)
*G08B 6/00* (2006.01)
*H04M 1/725* (2006.01)
*G06F 3/0483* (2013.01)

(52) U.S. Cl.
CPC ............ *G08B 6/00* (2013.01); *G06F 3/0483* (2013.01); *H04M 1/72547* (2013.01); *H04M 1/72591* (2013.01); *H04M 1/72594* (2013.01)

(58) Field of Classification Search
USPC ................... 340/4.12, 4.1, 7.6, 407.1, 407.2
See application file for complete search history.

(56) References Cited

U.S. PATENT DOCUMENTS

| 6,326,901 | B1 * | 12/2001 | Gonzales | 340/7.2 |
|---|---|---|---|---|
| 6,359,550 | B1 * | 3/2002 | Brisebois et al. | 340/407.1 |
| 7,098,776 | B2 * | 8/2006 | Chang et al. | 340/407.1 |
| 8,093,997 | B2 * | 1/2012 | White | 340/407.2 |
| 2004/0189484 | A1 * | 9/2004 | Li | H04M 1/72552 340/4.12 |
| 2010/0013612 | A1 * | 1/2010 | Zachman | 340/407.1 |
| 2011/0169622 | A1 * | 7/2011 | Billmaier et al. | 340/407.1 |
| 2012/0044062 | A1 * | 2/2012 | Jersa et al. | 340/407.1 |
| 2013/0115579 | A1 * | 5/2013 | Taghavi | G06F 3/016 434/113 |

* cited by examiner

*Primary Examiner* — Brent Swarthout
(74) *Attorney, Agent, or Firm* — Eugenio J. Torres-Oyola; Victor Rodriguez-Reyes; Rafael Rodriguez-Muriel (57) ABSTRACT

Devices, systems and methods for communicating to another user or users through skin response technology are provided. The present disclosure provides for receiving at least one message over a network by a mobile device; transmitting the received at least one message to a vibrotactile device configured to be worn on the skin of a user; converting, by the vibrotactile device, the transmitted at least one message into a predefined vibration pattern; and effecting the predefined vibration pattern onto the skin of a user by at least one actuating element of the vibrotactile device.

17 Claims, 4 Drawing Sheets

FIG. 5

DEVICE, SYSTEM AND METHOD FOR MOBILE DEVICES TO COMMUNICATE THROUGH SKIN RESPONSE

PRIORITY

This application claims priority on U.S. Provisional Patent Appl. No. 61/446,774 filed Feb. 25, 2011.

BACKGROUND

Field

The present disclosure relates generally to devices, systems and methods for communicating to another user or users through skin response technology.

Description of the Related Art

Portable Haptic technology, or haptics, is a tactile feedback technology that takes advantage of a user's sense of touch by applying forces, vibrations, and/or motions to the user. This mechanical stimulation may be used to assist in the creation of virtual objects (objects existing only in a computer simulation), for control of such virtual objects, and for the enhancement of the remote control of machines and devices (teleoperators). Some simple haptic devices are common in the form of game controllers, in particular of joysticks and steering wheels. At first, such features and/or devices used to be optional components (like the Nintendo 64 controller's Rumble Pak). Now many of the newer generation console controllers and some joysticks feature built in devices (such as Sony's DualShock technology). An example of this feature is the simulated automobile steering wheels that are programmed to provide a "feel" of the road. As the user makes a turn or accelerates, the steering wheel responds by resisting turns or slipping out of control. Other examples for devices with different types of haptic technologies include, among others, cell phones from like LG and Motorola. In most cases this takes the form of vibration response to touch.

Haptics is enabled by actuators that apply the forces to the skin for touch feedback. The actuator provides mechanical motion in response to an electrical stimulus. Most early designs of haptic feedback use electromagnetic technologies such as vibratory motors with an offset mass, such as the pager motor, that is in most cell phones or voice coils where a central mass or output is moved by a magnetic field. The electromagnetic motors typically operate at resonance and provide strong feedback, but have limited range of sensations. Next-generation actuator technologies are beginning to emerge, offering a wider range of effects thanks to more rapid response times. Next generation haptic actuator technologies include Electroactive Polymers, Piezoelectric, and Electrostatic surface actuation.

Several vibro-tactile devices have been proposed over the years and some of them were commercially offered. Proposed devices include Vibro-Tactile Space-Awareness Belt (Fercha, et al.) that included eight vibrator elements, all lined up on the fabric of a wrist belt, and connected to belt controller which is built upon an Atmega 32-based microcontroller board. In this system the controller activates the vibrator switches according to commands received. Another device is the Wearable Vibrotactile Feedback Suit for Improved Human Motor Learning proposed by Lieberman and Breazeal at Massachusetts Institute of Technology (MIT). The system includes optical tracking, tactile actuators, feedback software and hardware for output control. ComTouch is another device proposed in the joint work by researchers from MIT Media Lab and Tufts University in 2002. ComTouch is a vibrotactile device sleeve that fits over the back of a mobile phone. The basic concept is a handheld device that translates finger pressure into vibration. The devices are bi-directional and both users can send and receive signals simultaneously. In 2003 Wearable Computer Laboratory from the University of South Australia and the Department of Textiles and Apparel at Cornell University collaborated to device a Shoulder Pad Insert for vibrotactile feedback. The device was intended to help with navigation for both fully-sighted and seeing-impaired individuals, generate silent alerts, socially subtle transmission of information, and motion guidance for physical activity. Besides these devices proposed via research, commercial vibrotactile devices include Tactaid and Tactilator from Audiological Engineering Corp.

SUMMARY

Devices, systems and methods for communicating to another user or users through skin response technology are provided.

According to one aspect of the present disclosure, a system for communicating a message to a user is provided including a mobile device including a communication module configured to receive at least one message over a network and a transmission module for transmitting the received at least one message to a vibrotactile device; and the vibrotactile device configured to be worn on a user, the vibrotactile device including a second transmission module for receiving the transmitted at least one message; a processor for converting the transmitted at least one message into a predefined vibration pattern; and at least one actuating element configured for effecting the predefined vibration pattern onto skin of a user.

In one aspect, the at least one actuating element is selected from the group consisting of electroactive polymer elements, piezoelectric elements and electrostatic surface actuation elements.

In another aspect, the predefined vibration pattern is in accordance with Morse code, Braille system or a defined pattern programmed into a memory of the vibrotactile device by the user.

In yet another aspect, the at least one message is an e-mail message or a SMS text message.

In a further aspect, the vibrotactile device is configured as a flexible pad that conforms to skin of a user or a watch worn upon a user's wrist.

According to another aspect of the present disclosure, a method for communicating a message to a user includes receiving at least one message over a network by a mobile device; transmitting the received at least one message to a vibrotactile device; converting, by the vibrotactile device, the transmitted at least one message into a predefined vibration pattern; and effecting the predefined vibration pattern onto skin of a user by at least one actuating element disposed in the vibrotactile device.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail.

A device, system and method for communicating a message to a user or users through skin response are provided. A mobile device of the present disclosure, e.g., a cellular phone, GSM phone, media player, personal digital assistant (PDA), etc., will enable a user to receive a message on the mobile device which is transferred to a vibrotactile device worn on the user. In this manner, a user can receive a message without letting anyone know that they are receiving a message. It is to be appreciated that the message may take the form of an e-mail, text message, predefined coded message, etc. Various types of mobile device are contemplated by the present disclosure.

To allow a user to communicate to another user or users through skin response technology. Further, to allow a first user to communicate to a second user or multiple users through skin response including haptic feedback. This type of communication will be extremely useful to those users who are hearing impaired as well as those users who are visually impaired. Moreover, this communication method will also benefit all users who do not want to hear or see messages that are being communicated to them through Portable Device Assistants or mobile devices such as cellular phones.

Figure 1:
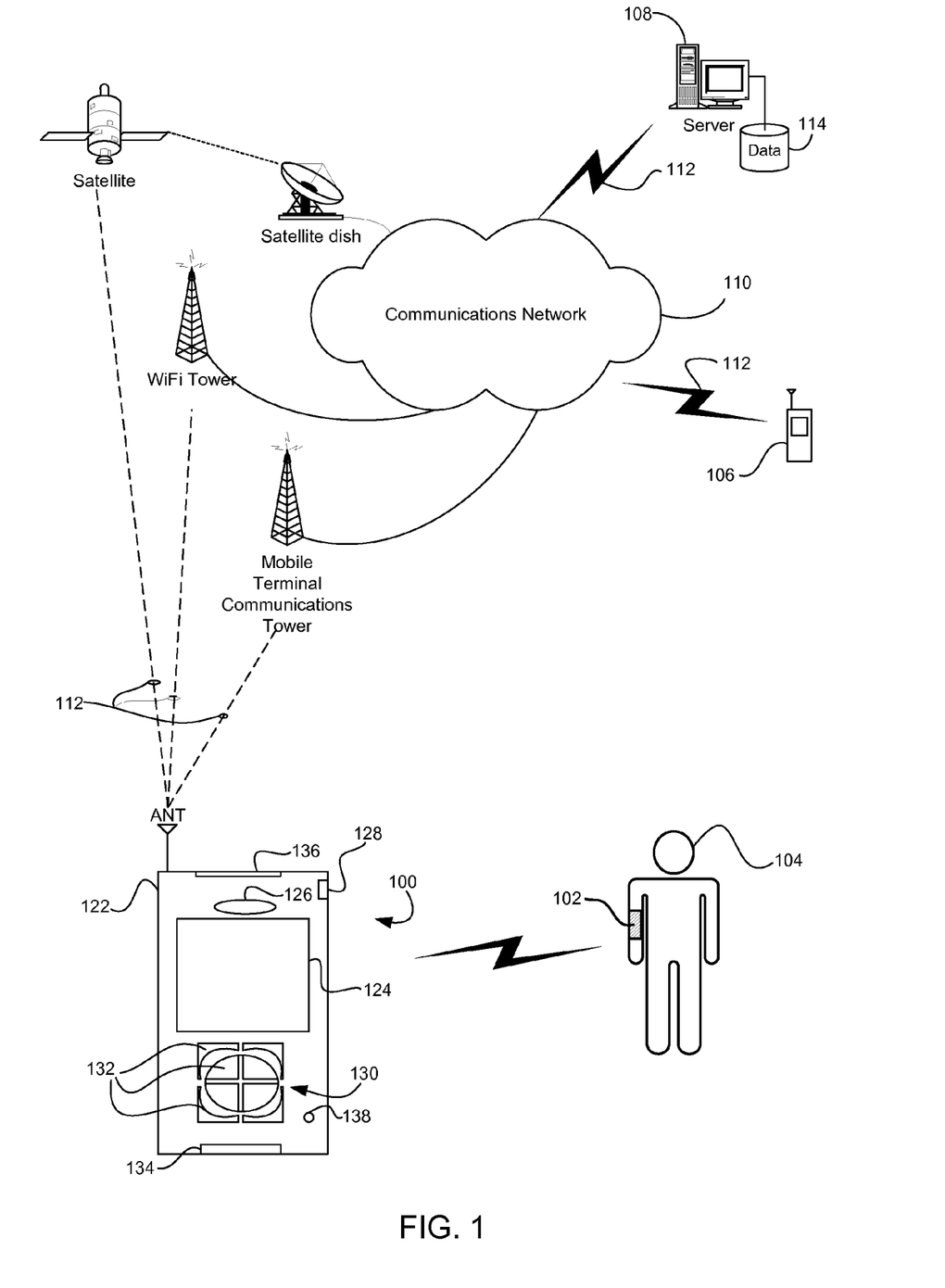
FIG. 1 illustrates a system for communicating a message to a user through skin response in accordance with an embodiment of the present disclosure.

Referring to FIG. 1, a system in accordance with the present disclosure is illustrated. The system includes a mobile device 100 and a vibrotactile device 102 configured to be worn on a user 104. The device 100 will communicate to a mobile device of another user 106 or a server 108 via a communication network 110. The device 100, mobile device 106 and server may be connected to the communications network 110, e.g., the Internet, cellular network, etc., by any known means, for example, a hardwired or wireless connection 112, such as dial-up, hardwired, cable, DSL, satellite, cellular, PCS, wireless transmission (e.g., 802.11a/b/g), etc. It is to be appreciated that the network 110 may be any network known in the art including a telephone network (e.g., a plain old telephone service (POTS) network), a mobile phone network (e.g., cellular, PCS. GSM, etc.), a computer network, a switch data packet network, etc. In one embodiment, the network 110 may be a local area network (LAN), wide area network (WAN), the Internet or any known network that couples a plurality of computers and digital devices to enable various modes of communication via network messages. Furthermore, the server 108 will communicate using the various known protocols such as Transmission Control Protocol/Internet Protocol (TCP/IP), File Transfer Protocol (FTP), Hypertext Transfer Protocol (HTTP), etc. and secure protocols such as Internet Protocol Security Protocol (IPSec), Point-to-Point Tunneling Protocol (PPTP), Secure Sockets Layer (SSL) Protocol, etc. The server 108 will further include a storage medium 114 for storing a database which links an identifier, e.g., a telephone number, to a user of the system of the present disclosure, the details of which will be described in detail below.

The mobile device 100 includes various electrical components, which will be described in detail below, disposed in a generally rectangular housing 122. A display module 124 is provided for displaying video and image media content, such as movies, animations, etc. and a speaker 126 is provided configured to produce audio, e.g., music or a soundtrack associated with a video. An audio port 128 will be configured to receive a plug or connector from a headphone, stereo system, etc. to stream the audio to the connected device. It is to be appreciated that when an external device is connected to the audio port 128 the speaker 126 will be disabled. Input module 130 includes a plurality of buttons 132 for inputting data and navigating through a plurality of menus. A touch screen overlaid upon the display module 124 may also be coupled to the input module for facilitating user input. The mobile device 100 further includes a storage module 134 for storing a plurality of content and/or a list of contacts, i.e., a list of persons or entities to be contacted upon triggering an alert.

A transmission module 136 is provided for transmitting/receiving data and/or content to another device, e.g., a personal computer, a personal digital assistant (PDA), a server residing on the Internet, etc. Optionally, the mobile device 100 may include a microphone 138 for acquiring audio from the user of the device to input data.

Figure 2:
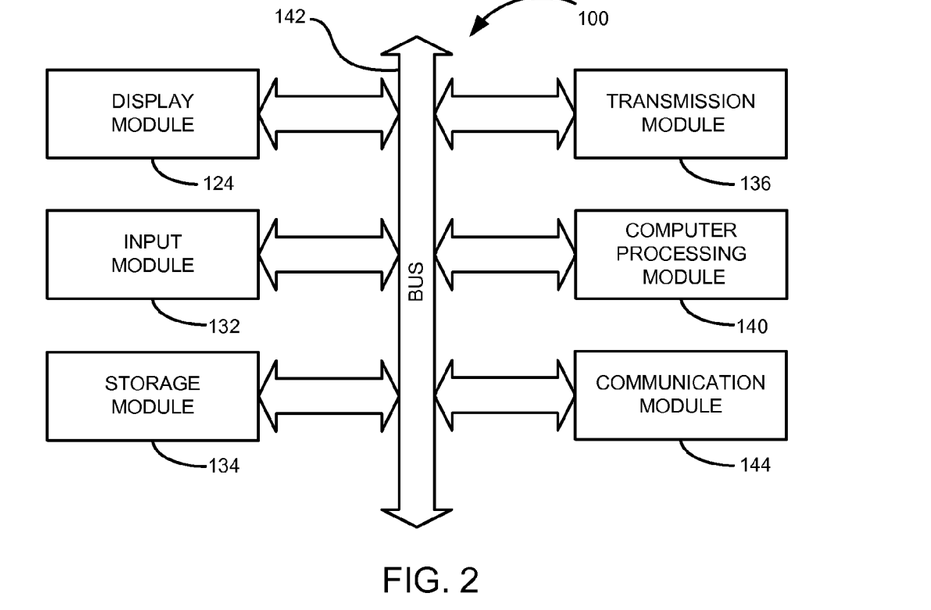
FIG. 2 is a block diagram of various modules included in the mobile device illustrated in FIG. 1.

Referring to FIG. 2, the various components of the device 100 will now be described. The device will contain a computer processing module 140, e.g., a microprocessor. The computer processing module 140 will use computer software instructions that have been programmed into the module and conventional computer processing power to interact and organize the traffic flow between the various other modules. It is to be understood that the present disclosure may be implemented in various forms of hardware, software, firmware, special purpose processors, or a combination thereof. A system bus 142 couples the various components shown in FIG. 2 and may be any of several types of bus structures including a memory bus or memory controller, a peripheral bus, and a local bus using any of a variety of bus architectures. The device also includes an operating system and micro instruction code preferably residing in read only memory (ROM) (not shown). The various processes and functions described herein may either be part of the micro instruction code or part of an application program (or a combination thereof) which is executed via the operating system. Exemplary operating systems include but are not limited to SymbianOS, Windows Mobile/Windows CE, Palm OS, Linux, Blackberry OS, BREW, webOS, Android, iOS, etc. which have been developed for mobile computing applications and can handle both data computing and communication applications, e.g., voice communications.

It is to be further understood that because some of the constituent device components and method steps depicted in the accompanying figures may be implemented in software, the actual connections between the device components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The computer processing module 140 may further include, in addition to a microprocessor, a digital signal processor (DSP) for decoding stored audio, video and photo files to be played on the device 100. As is known in the art, the DSP may include several known decompression algorithms for decompressing stored media content, e.g., a MP3 file. The device 100 of the present disclosure will support various file types including but not limited to Microsoft Windows Media Video files (.wmv), Microsoft Photo Story files (.asf), Microsoft Windows Media Audio files (.wma), MP3 audio files (.mp3), JPEG image files (.jpg, .jpeg, .jpe, .jfif), MPEG movie files (.mpeg, .mpg, .mpe, .m1v, .mp2v .mpeg2), Microsoft Recorded TV Show files (.dvr-ms), Microsoft Windows Video files (.avi and .wmv), realmedia files (.rm) and Microsoft Windows Audio files (.wav).

The device 100 will also contain a display module 124 for displaying digital information such as video files, image files, text files, etc. This display may be in any current form in the art, including Liquid Crystal Displays (LCD), Light emitting diode displays (LED), Active Matrix Organic Light Emitting Diodes (AMOLED), Cathode Ray Tube Displays (CRT) or any other type of display currently existing or existing in the future. The display module 124 may also include an audio output device, e.g., a speaker 126, audio port 128, etc., allowing the user to also hear audio output from the device 100, e.g., audio associated with a video, a MP3 file, etc.

The mobile device 100 of the present disclosure will contain a user input module 130 to either receive user instructions via text input by the way of buttons 132, a standard keyboard interface coupled to the device, or a character recognition capture device which translates user text input into alphanumeric characters. Preferably, the character recognition device is a touch screen which overlays the display module 124 and text is entered via a pen-like stylus. Such input devices are standard and currently available on many electronic devices including portable digital assistants (PDAs) and cellular telephones. Optionally, microphone 138 may be further coupled to the input module 130 for capturing any audio information spoken by the user and the input module will further include an analog-to-digital (A/D) converter for converting the spoken audio information into a digital format. Furthermore, the input module may include a voice recognition processor that translates the digital human voice into alpha numeric characters for user input. The user will utilize the user input module 130 to enter various data, for example, to enter payment information, to initiate communication with a remote server, to flag desired content to be downloaded, to request an initial selection of media content to be downloaded, etc.

The storage module 134 includes internal storage memory, e.g., random access memory (RAM), or removable memory such as magnetic storage memory; optical storage memory, e.g., the various known types of CD and DVD media; solid-state storage memory, e.g., a CompactFlash card, a Memory Stick, SmartMedia card, MultiMediaCard (MMC), SD (Secure Digital) memory; or any other memory storage that exists currently or will exist in the future. The storage module 134 includes a list of contacts, pre-defined messages that are transmitted to the vibrotactile device, etc.

The transmission module 136 will enable the device 100 to transmit or transfer information to other computing devices and to receive information from other computing devices, e.g., digital media files, encryption/decryption keys, etc. The transmission module 136 will perform its functionality by hardwired and/or wireless connectivity. The hardwire connection may include but is not limited to hard wire cabling e.g., parallel or serial cables, USB cable, Firewire (1394 connectivity) cables, and the appropriate port. The wireless connection will operate under any of the various known wireless protocols including but not limited to Bluetooth™ interconnectivity, infrared connectivity, radio transmission connectivity including computer digital signal broadcasting and reception commonly referred to as Wi-Fi or 802.11.X (where x denotes the type of transmission), satellite transmission or any other type of communication protocols or systems currently existing or to be developed for wirelessly transmitting data. The transmission module will compress and encode the encrypted information for transmission using any known wireless communication technology. In one embodiment, antenna ANT is coupled to the transmission module 136 for extending the wireless transmission range of the device 100.

Optionally, the device 100 may include a capture module 122 to capture an image desired by the user in digital form, e.g., an image of a perpetrator of a crime. The capture module includes an image sensor, an analog-to-digital (A/D) converter and a digital signal processor (DSP). The image sensor includes preferably millions of photosensors, e.g., pixels, wherein each pixel absorbs the light and transforms the light into an electric charge proportional to the intensity of light. Each charge is transmitted to an A/D converter where the charge is converted into a digital value representing the color the pixel will be, e.g., representing different intensities of red, green and blue. The digital values are then passed to the digital signal processor which enhances the image, compresses it and then stores it in a digital file format in the storage module 134.

A locational information module may optionally be provided for determining a location of the device 100 and/or user. The locational information module may include a receiver and antenna ANT employing conventional locational information processing technology such as Global Positioning Satellite (GPS) Technology, Loran Technology, or any other available locational technology, to indicate the exact location, e.g., latitude, longitude and altitude, of the device 100.

The mobile device 100 may also optionally include an encryption module. The encryption module will use conventional code encryption algorithms currently in use or that will be in use in the future such as symmetric-key algorithms, e.g., DES, AES, Triple-DES, Blowfish, RC2, RC4, RC5, etc, and asymmetric-key algorithms, e.g., Diffie-Hellman, RSA, ElGamal, etc. to data that is stored in the storage module 134. The encryption module may also encrypt photos or the pre-defined massage before transmission to another device or server.

Furthermore, the device 100 will include a date and time module. The date and time module will use standard computer chip processing technology widely in use, e.g., a crystal, or alternatively, input from a GPS receiver or cellular provider, to supply the date and time.

In one embodiment, the device 100 according to the principles of the present disclosure is embodied as a mobile phone including the modules and architecture illustrated in FIG. 2. In this embodiment, microphone 106 is further coupled to a communication module 144 for encoding a user's speech to be transmitted via antenna ANT using CDMA, PCS, GSM or any other known wireless communication technology. The user will enter phone numbers to be dialed via the touch screen, or alternatively, as is known in the mobile phone art, the device 100 may include a full QWERTY keyboard as an input module to enter text information. In addition to producing audio from audio or multimedia content, speaker 116 will be coupled to the antenna ANT and a decoder for receiving and decoding voice communication from another mobile phone.

It is to be appreciated that the communication module 144 may include a single integrated circuit chip to perform data transfer and voice communications or a single module including a separate data transfer chip, e.g., a WiFi transceiver, and a separate voice communication chip, e.g., a CDMA chip. In one embodiment, the communication module will operate on the wireless GPRS (General Packet Radio Service) data protocol or a 3G protocol such as W-CDMA, CDMA2000 and TD-SCDMA. Both the GPRS and 3G protocols have the ability to carry both voice and data over the same service.

It is to be appreciated that the device 100 described above is an exemplary device and may include all or a portion of the modules described above. Furthermore, it is to be appreciated that existing mobile devices, e.g., mobile phones, digital media playback device, may be used in accordance with the principles of the system and method of the present disclosure described below.

Figure 3:
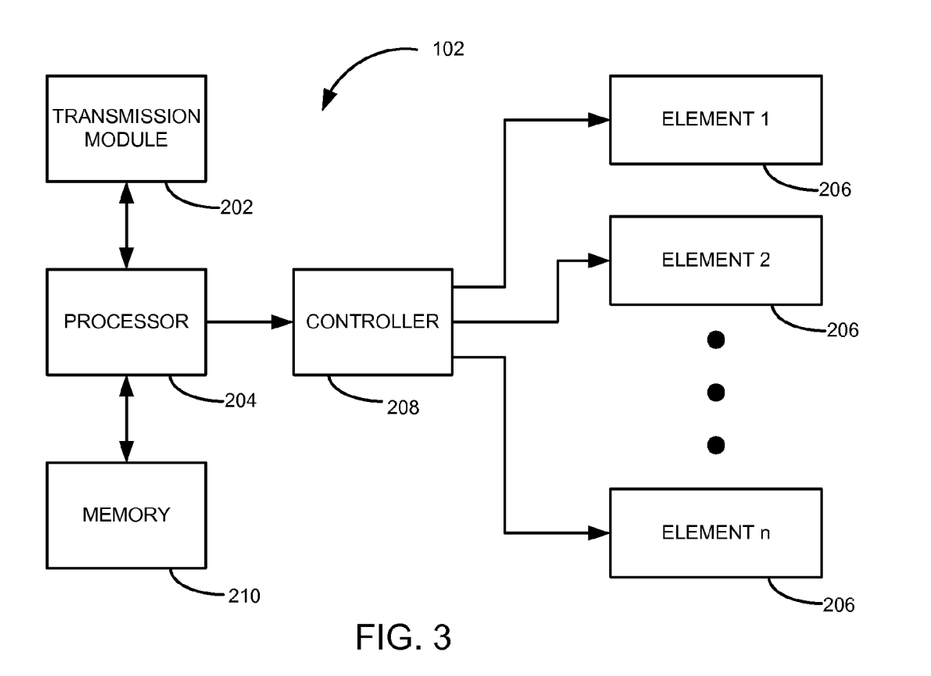
FIG. 3 is a block diagram of various modules included in the vibrotactile device illustrated in FIG. 1.

Referring to FIG. 3, an exemplary vibrotactile device 102 is illustrated. The vibrotactile device 102 includes a transmission module 202 for receiving a message from the mobile device 100, at least one processor 204 for converting the received message into a predefined vibration pattern, and at least one actuator or vibrator element 206 configured for effecting the predefined vibration pattern onto skin of a user. A controller 208 is coupled to each actuator 206 forming a control and drive circuit. The controller 208 is built upon a microcontroller board. It is to be appreciated that the vibrotactile device 102 is configured to be worn on any skin surface, and may take many forms such as a generally planar, flexible pad or a wrist watch.

In one embodiment, the actuators or vibrator elements 206 have high output power density and resonant frequency of 250 Hz (for maximum detection by humans). The tactile actuators function as resonant actuators, utilizing a coil attached to the end of a resonant spring, turned on and off manually at the resonant frequency of the mass-spring combination. This allows the frequency to be controlled independently of amplitude and allows very quick ring-up and ring-down times. The high bandwidth response is ideal for the quick feedback responses. It is to be appreciated that the actuators or vibrator elements 206 may take many forms such as but not limited to electroactive polymer elements, piezoelectric elements, electrostatic surface actuation elements, etc.

The vibrotactile device 102 includes onboard resident memory 210 coupled to the programmable computer processor 204. Computer control programmable software resident in the processor 204 and/or memory 210 is provided to determine what vibrotactile signals should be sent to the actuators 206, via controller 208, to provide tactile feedback to the user.

The transmission module 202 enables the vibrotactile device 102 to communicate wirelessly thorough communications channels such as Wifi, Bluetooth, infrared, cellular communications, satellite communications, cabling, etc. to the mobile device 100.

Figure 4A:
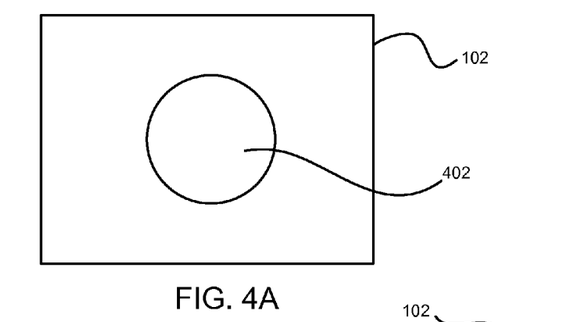
FIG. 4 illustrates various types of vibrotactile devices in accordance with an embodiment of the present disclosure.

It is to be appreciated that the vibrotactile device 102 may take many forms and configurations. Referring to FIG. 4, exemplary vibrotactile device are illustrated. In FIG. 4A, a vibrotactile device with a single actuator or vibrator element 402 is shown. In this configuration, the element 402 may tap or vibrate against the user to indicate the mobile device 100 has received a message. In one embodiment, the controller 208 will cause the element 402 to activate in predefined pattern to provide to the user wearing the vibrotactile device 102 a specific message. The predefined pattern may be in accordance with Morse code, Braille or a pattern predefined by the user and loaded into memory 210.

Figure 4B:
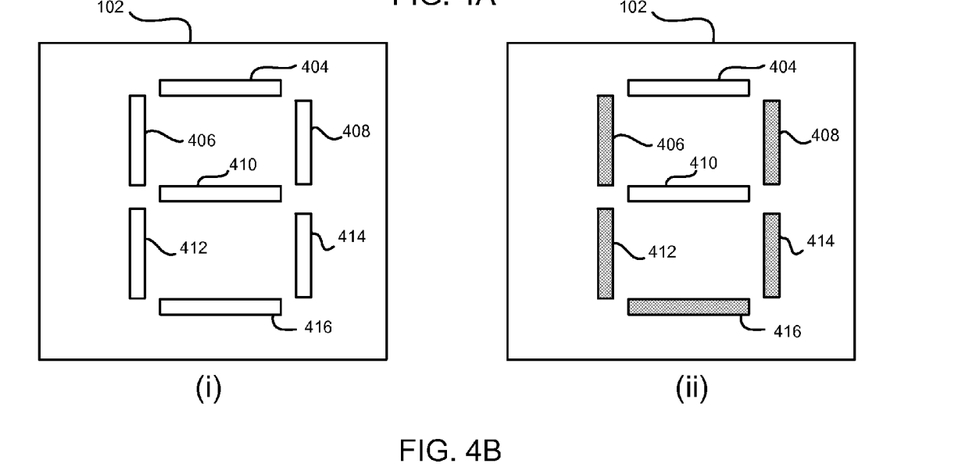

FIG. 4B illustrates yet another configuration of the vibrotactile device 102. In the configuration shown in FIG. 4B(i), the vibrotactile device 102 includes at least seven elements 404-416 arranged similar to a seven segment display. In this embodiment, the controller will selectively activate specific elements to relay a message to a user. In the example shown in FIG. 4B(ii), the controller 208 activates elements 406, 408, 412, 414 and 416 to impart the letter "U" onto the skin of a user, for example, alerting the user that the mobile device 100 has received an urgent message. By employing the seven element configuration shown in FIG. 4B, the controller 208 can create virtually any letter and/or number to spell out a specific message to the user.

Figure 4C:
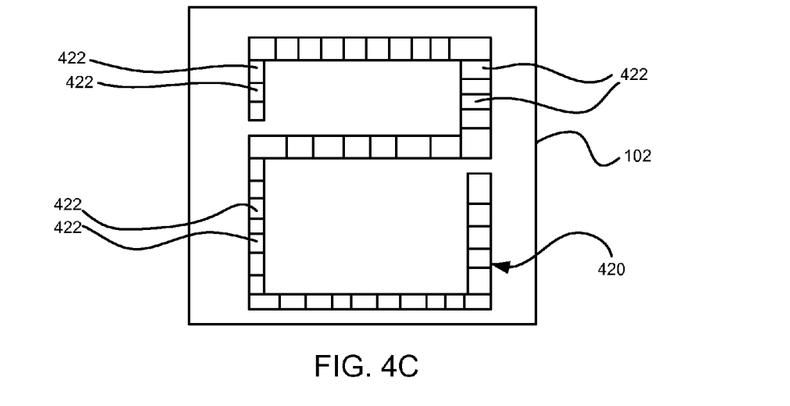

Similarly, in FIG. 4C, the vibrotactile device 102 may include element 420 which includes a plurality of actuator or vibrator element 422 throughout. In this embodiment, the controller 208 will selectively activate the individual elements 422 to trace out a message to the user.

It is to be appreciated that the vibrotactile device 102 housing the actuator or vibrator elements may take many forms. For example, the actuator or vibrator elements may be disposed in a flexible, pad that will be applied to the user's skin. In another embodiment, the actuator or vibrator elements may be disposed in a watch worn upon a user's wrist. Many other configurations are contemplated and fall within the scope of the present disclosure.

Figure 5:
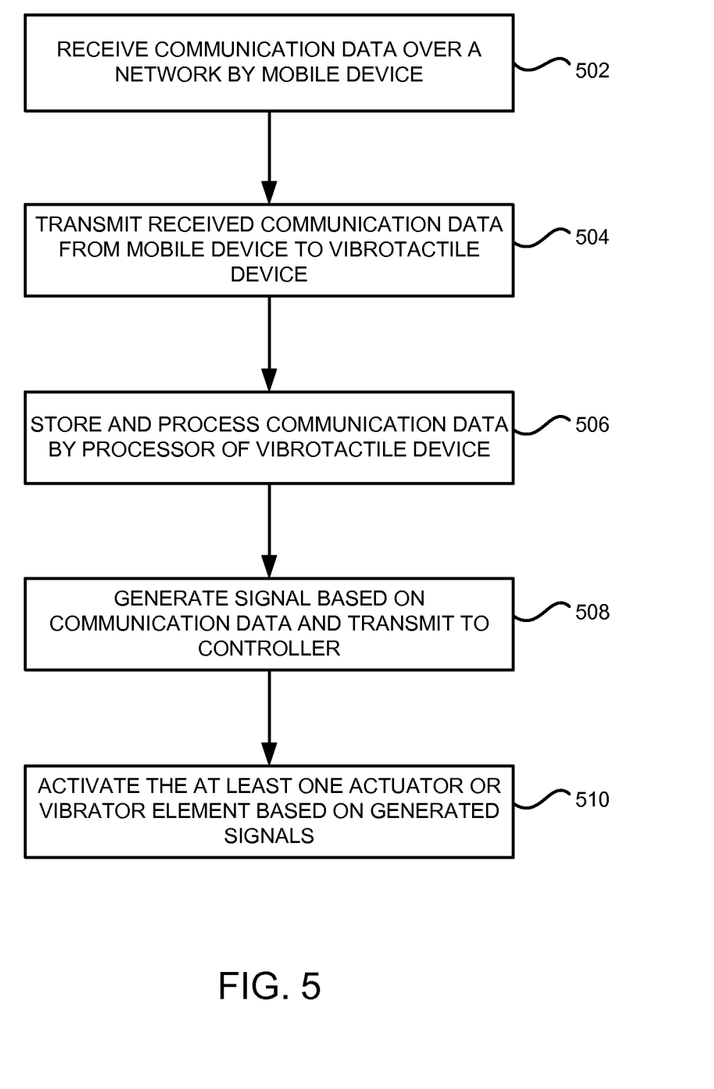
FIG. 5 is a flow diagram illustrating a method for communicating a message to a user through skin response according to an embodiment of the present disclosure.

With reference to FIG. 5, a method of the present disclosure is described. Initially, in step 502, the portable mobile device 100 (e.g., PDA, cell phone, etc.) receives communications data, e.g., a message string such as an e-mail or text, via standard communication channels. This communication channels include but are not limited to cellular communication, WiFi communication, satellite communication, Bluetooth communication, infrared communication or any other communication to be developed. Examples of mobile devices include but are not limited to cellular telephones such as the iPhone™ from Apple™, and the Blackberry™ from Research in Motion™, various Android™ phones licensed by Google™, or PDA devices such as devices from Palm™ USA.

In step 504, the received message string is communicated to the processor 204 contained in the vibrotactile device 102, via the transmission module 202 using supported wireless communication technology (e.g. Infrared, cellular, Bluetooth, WiFi, etc.). The message string may include one word or a series of words.

Next, in step 506, the control software loaded in the processor 204 within the user's vibrotactile device 102 reads the communicated message string, stores it in the resident memory 210, and then processes the communicated message string based on software or hardware based programmed logic. In step 508, the processing performed by the processor 204 involves reading each letter in the message, generating a corresponding signal or instructions and communicating the signal/instructions to the controller 208. In embodiment of this disclosure, the processing logic involves translation of the message string to Braille symbols for the visually impaired user and then directing the controller 208 to generate the required vibration pattern emulating the Braille letters. Programmed logic may also include support to specific symbology. For example, a symbol like C or U could indicate that the sender of the message wants the subject to call or that it was urgent. Other symbols could indicate other messages strings and shorthand symbology could be supported as well.

By example, if an SMS message was transmitted to the vibrotactile device, the following steps would be executed within the vibrotactile pad:
  a. Control software loads the SMS message string into resident memory 210.
  b. Control software parses the text message to read each character and store it in resident memory 210.
  c. Control software processes each character comparing it with a static character set loaded in memory. Each character in the set has processing instructions associated with it. Instructions would be to trigger a specific vibration pattern as feedback mechanism.
  d. Once a match is found for the character being processed, instructions associated with the matching character are read from resident memory 210.
  e. Obtained instructions are communicated to the controller 208.

The vibrotactile's controller 208 receives the instructions from the processor 204 to trigger the appropriate vibration pattern. In step 510, the required vibration pattern is triggered by the controller 208 sending the required signals to the motors or actuators 206 in the vibrotactile device 102 by activating the actuators or vibrator elements according to the commands received from the processor 204. Activation parameters such as intensity, duration, and frequency are passed to each of the actuators or elements 206. The vibration pattern generated by the actuators creates the sense of touch, via, for example, tracing the letter, to help the user perceive the communicated letter or symbol and thus communicate the message string.

The teachings and principles of the present disclosure enable the following non-limiting, exemplary applications. It is to be appreciated that the following is not an exhaustive list of possible applications.

A user affixes the vibrotactile device (e.g., a pad) to his skin. This pad is in communication with the user's mobile device. This mobile device has e-mail and SMS (Short Message Service) send and receive capacity. The user is in a meeting where he does not want to be seen viewing his mobile device. Yet, the user needs to know when the message is being received and the content of the message. The user is alerted to the message receipt by a vibration that is felt on his skin surface from the vibrotactile device, i.e., the pad. The message (e.g., a brief message to call his colleague X) is then communicated by the vibrotactile device by tracing the message in shorthand on the user's skin surface. The user is thus informed of the message without ever having to look at the display of his mobile device.

A non-sighted (blind) user affixes the vibrotactile device (e.g. a vibrotactile pad) to his skin. This vibrotactile device (e.g. a vibrotactile pad) is in communication with the user's mobile device. This mobile device has e-mail and SMS send and receive capacity. The user receives a message on their mobile device. The message is communicated to the user through the vibrotactile device, allowing the non-sighted user to receive the message without being able to see the mobile display. Braille or another form of symbology may be utilized in the communication process. In the case of a non-sighted and hearing disabled user, this method of communication is extremely important since it may represent the only means of communication to the user from the user's mobile device.

A non-sighted (blind) and possibly hearing disabled user affixes the vibrotactile pad (e.g., a vibrotactile pad) to his skin. This vibrotactile device is in communication with the user's mobile device. The mobile device contains text that the user wants to be able to comprehend. The text may be an article, an e-book, a word document, or any other type of textual document. The mobile device transmits the text to the memory of the vibrotactile device, which in turn transmits the text to the user by using the at least one actuator in the vibrotactile pad. Braille or another form of symbology may be utilized in the communication process. Thus, a disabled person is able to access and understand text.

Furthermore, although the foregoing text sets forth a detailed description of numerous embodiments, it should be understood that the legal scope of the present disclosure is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

What is claimed is:

1. A system for communicating a message to a user comprising:
  a mobile device including a communication module configured to receive at least one message over a network and a transmission module for transmitting the received at least one message to a tactual device; and
  the tactual device configured to be worn on a user, the tactual device including:
  a second transmission module for receiving the transmitted at least one message;
  a tactually perceivable predetermined set of patterns stored in memory that represent alphanumerical characters, words and phrases;
  a processor for converting the transmitted at least one message into a signal based on said set of patterns; and
  a plurality of actuating elements that receive said signal and are selectively activated as required by said tactually perceivable patterns configured for effecting the converted message as tactual patterns perceivable by any part of the skin of a user where the tactual device was placed;
  each actuating element being located independently from each other.

2. The system as in claim 1, wherein the plurality of actuating elements is selected from the group consisting of electroactive polymer elements, piezoelectric elements and electrostatic surface actuation elements.

3. The system of claim 1, wherein the predefined tactual pattern is in accordance with Morse code.

4. The system of claim 1, wherein the predefined tactual pattern is in accordance with Braille system.

5. The system of claim 1, wherein the predefined tactual pattern is programmed into a memory of the tactual device by the user.

6. The system of claim 1, wherein at least one message is an e-mail message.

7. The system of claim 1, wherein at least one message is a SMS text message.

8. The system of claim 1, wherein the tactual device is configured as a flexible pad that conforms to skin of a user.

9. The system of claim 1, wherein the tactual device is configured as a watch worn upon a user's wrist.

10. A method for communicating a message to a user comprising:
    receiving at least one message over a network by a mobile device;
    transmitting the received at least one message to a tactual device worn by a user;
    converting, by the tactual device, the transmitted at least one message into a set of predetermined tactually perceivable patterns that represent alphanumerical characters, words and phrases stored in memory; and
    a plurality of actuating elements selectively activated as required by said tactually perceivable patterns configured for effecting the converted message as tactual patterns perceivable by any part of the skin of a user where the tactual device was placed;
    each actuating element being located independently from each other.

11. The method as in claim 10, wherein the plurality of actuating elements is selected from the group consisting of electroactive polymer elements, piezoelectric elements and electrostatic surface actuation elements.

12. The system of claim 10, wherein the predefined tactual pattern is in accordance with Morse code.

13. The system of claim 10, wherein the predefined tactual pattern is in accordance with Braille system.

14. The method of claim 10, further comprising programming the predefined tactual pattern into a memory of the tactual device by the user.

15. The method of claim 10, wherein at least one message is an e-mail message.

16. The method of claim 10, wherein at least one message is a SMS text message.

17. The method of claim 10, wherein the tactual device is configured as a flexible pad that conforms to skin of a user or a watch worn upon a user's wrist.

\* \* \* \* \*